US006741372B1

(12) United States Patent
Murakami

(10) Patent No.: US 6,741,372 B1
(45) Date of Patent: May 25, 2004

(54) IMAGE READING DEVICE, METHOD FOR CONTROLLING THE IMAGE READING DEVICE, AND STORAGE MEDIUM STORING PROGRAM FOR CONTROLLING THE IMAGE READING DEVICE

(75) Inventor: Atsushi Murakami, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 511 days.

(21) Appl. No.: 09/645,338

(22) Filed: Aug. 25, 2000

(30) Foreign Application Priority Data

Aug. 26, 1999 (JP) .......................................... 11-239866

(51) Int. Cl.$^7$ ............................................... H04N 1/04
(52) U.S. Cl. ...................................... 358/475; 358/474
(58) Field of Search ................................ 358/475, 509, 358/484, 474, 487, 505, 506; 355/30, 67; 250/205; 362/6, 580, 260, 800, 20; 399/220; 382/312, 313, 319, 318

(56) References Cited

U.S. PATENT DOCUMENTS

| 5,907,742 | A | * | 5/1999 | Johnson et al. ................ 399/51 |
| 6,316,767 | B1 | * | 11/2001 | Paxton et al. ................ 250/234 |
| 6,433,895 | B1 | * | 8/2002 | Hansen ........................ 358/475 |
| 6,549,305 | B1 | * | 4/2003 | Chen ........................... 358/475 |

* cited by examiner

Primary Examiner—Cheukfan Lee
(74) Attorney, Agent, or Firm—Oliff & Berridge, PLC

(57) ABSTRACT

An image reading device includes a cold-cathode lamp as a light source for image reading. The cold-cathode lamp is lit even when the image reading is not performed. A temperature detecting device detects a wall temperature of the cold-cathode lamp or a temperature that has correlation to the lamp wall temperature, and a lighting-out control device turns off the cold-cathode lamp when image reading is not being performed and when a temperature detected by the temperature detecting device is equal to or below a first predetermined temperature. In the image reading device, the image reading operation starts immediately after a user's designation under normal office conditions. As a result, the operating life of the lamp can be prolonged as much as possible.

18 Claims, 6 Drawing Sheets

Fig. 6A

| | CONTINUOUS LIGHTING HOURS |
|---|---|
| 10°C OR MORE | 14 |
| LESS THAN 10°C | 1 |

Fig. 6B

| | CONTINUOUS LIGHTING HOURS |
|---|---|
| 10°C OR MORE | 14 |
| 5°C UP TO BUT NOT INCLUDING 10°C | 1 |
| LESS THAN 5°C | 0.5 |

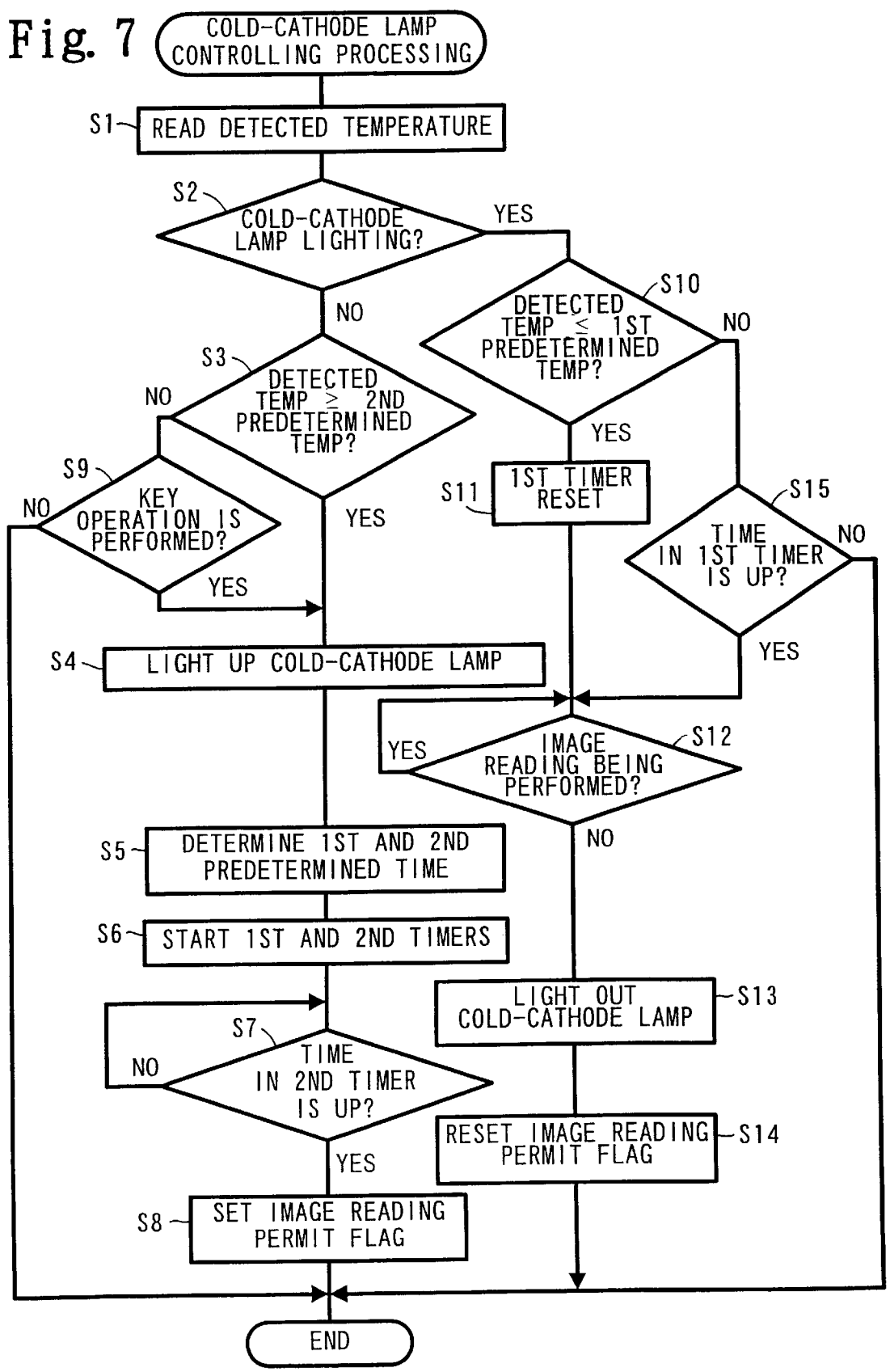

IMAGE READING DEVICE, METHOD FOR CONTROLLING THE IMAGE READING DEVICE, AND STORAGE MEDIUM STORING PROGRAM FOR CONTROLLING THE IMAGE READING DEVICE

BACKGROUND OF THE INVENTION

1. Field of the Invention

The invention relates to an image reading device in which a cold-cathode lamp is used as a light source for an image reading, and to a storage medium that stores programs for controlling the image reading device.

2. Description of the Related Art

In general, in a digital image reading device, light emitted from a light source for an image reading irradiates a read medium, such as an original document. The light reflected from the read medium is received by an image sensor, so that digital image signals, corresponding to images on the read medium, are obtained. In an analog image reading device, the light reflected from the read medium is guided onto a surface, such as that of a photo-conductive drum. Electrostatic latent images corresponding to images on the read medium are formed on the surface of the photo-conductive drum.

In the image reading devices, various light-emitting devices are used as a light source for the image reading. Among the light-emitting devices, a cold-cathode lamp has the advantages of a relatively low cost and a great amount of light emitted, so that images on the read medium can be read at a higher speed.

However, the cold-cathode lamp has a disadvantage of a certain length of time required, after a voltage is applied, to emit light at a brightness sufficient for the image reading. Therefore, when a user performs an image reading operation, a certain length of time is required to start the image reading after the voltage is applied to the cold-cathode lamp. Accordingly, the user cannot start the image reading operation immediately.

To reduce the time wasted before the image reading is started as much as possible, one possible solution is to continuously light the cold-cathode lamp. In a conventional image reading device, the cold-cathode lamp is continuously lit, until the power of the image reading device is turned off, after the power is turned on. If the cold-cathode lamp is continuously lit, as in the conventional image reading device, the brightness of the cold-cathode lamp will be sufficient when the image reading is designated by the user. Consequently, the user can start the image reading operation immediately, without wasting the time before the image reading is started.

However, the operating life of the cold-cathode lamp gradually decreases as the cumulative lighting hours increases. Accordingly, the brightness of the cold-cathode lamp is reduced, resulting in the insufficient brightness for the image reading. It is known that the operating life of the cold-cathode lamp is greatly affected by a lamp wall temperature. Specially, when the cold-cathode lamp is lit, if its wall temperature is low (at a low ambient temperature), the operating life of the lamp becomes extremely shortened. As the cold-cathode lamp is continuously lit, the life of the cold-cathode lamp expires within a short time, according to the ambient temperatures. Specially, when the cold-cathode lamp is employed, as a light source for the image reading in an apparatus, for example, a multi-function device, having various functions, such as facsimile functions, copying functions, printer functions, and image scanner functions, the power of the apparatus normally stays on, so that the cold-cathode lamp is continuously lit, day and night in all seasons. Consequently, the operating life of the lamp becomes shortened, especially when the cold-cathode lamp is continuously lit at a low ambient temperature, as described above. This leads to the frequent replacement of the lamp, and the costs, labor, and time for its replacement become significant.

SUMMARY OF THE INVENTION

One aspect of the invention is to provide an image reading device that includes a cold-cathode lamp, as a light source for image reading, and that immediately starts an image reading operation under normal room conditions, after a user's designation, and prolongs the operating life of the cold-cathode lamp as much as possible. Another aspect of the invention is to provide a method for controlling the image reading device and a storage medium that stores a program for controlling the image reading device.

According to one aspect of the invention, there is provided an image reading device including a cold-cathode lamp as a light source for image reading. The cold-cathode lamp is lit even when image reading is not performed. The image reading device may include a temperature detecting device that detects a wall temperature of the cold-cathode lamp or a temperature that has a correlation to the lamp wall temperature, and a lighting-out control device that lights out the cold-cathode lamp when the image reading is not performed and when a temperature detected by the temperature detecting device is equal to or below a first predetermined temperature.

In this image reading device, the lighting-out control device turns off the cold-cathode lamp when the image reading is not performed and when a temperature detected by the temperature detecting device is equal to or below the first predetermined temperature. Accordingly, an image reading operation can be immediately started, under normal room conditions, after a user's designation. In addition, the operating life of the cold-cathode lamp can be prolonged as much as possible. Included in the image reading device are such types that light reflected from read medium, such as an original document, is received by an image sensor, and that the light reflected from the read medium, is guided onto a surface of a photo-conductive member.

During the time when a multi-function device (MFD) including the image reading device of the invention is usually used, for example, from 8 a.m. to 8 p.m., the room temperature of, for example, an office will not so decrease, except for winter. In such seasons when a user feels cool, the office is generally heated during the above-described time, so that the room temperature does not decrease very much. Therefore, the cold-cathode lamp is lit during such time, and the image reading operation may be started immediately after the user presses, for example, a copy key of the MFD, so as to make a copy of the read medium. As the above-described time goes by and the heat in the office is turned off, the room temperature gradually decreases. Accordingly, the lighting-out control device may turn off the cold-cathode lamp.

Because the cold-cathode lamp is lit during the time when the user frequently uses the MFD, the copying operation can be started immediately. In addition, during the time when the user does not usually use the MFD, the cold-cathode lamp is not lit. Accordingly, the cumulative hours of lightning at lower temperatures will not be increased, so that the operating life of the cold-cathode lamp is prolonged as much as possible.

The cold-cathode lamp may be lit up at the time when the user presses the copy key first on the day, or when the room temperature exceeds the setting temperature.

The temperature detecting device is preferably disposed adjacent to the cold-cathode lamp. However, the temperature detecting device may be disposed on a surface of a case of the MFD, as a temperature that has a correlation to the lamp wall temperature can be detected thereon.

The first predetermined temperature may be set slightly lower than the ambient temperature during the time when the user frequently uses the MFD. The first predetermined temperature may be set prior to shipment, or the user can change the first predetermined temperature setting, according to geographic areas or seasons.

As the cold-cathode lamp lights for a first predetermined time or more, the lighting-out control device may turn off the cold-cathode lamp, even when the temperature detected by the temperature detecting device is not equal to or below the first predetermined temperature, if image reading is not performed. Accordingly, the operating life of the cold-cathode lamp may be prolonged as much as possible.

When the temperature at night is high, the cold-cathode lamp may not be controlled by the temperature, so as to be turned off. However, the cold-cathode lamp may be turned off, by limiting the continuous lighting hours thereof.

Further, the lighting-out control device may vary the first predetermined time, based on the temperature detected by the temperature detecting device. Accordingly, the operating life of the cold-cathode lamp may be prolonged as much as possible.

For example, when the detected temperature is equal to or below the setting temperature, the first predetermined time may be set to 1 hour. When the detected temperature exceeds the setting temperature, the first predetermined time may be set to 14 hours. Such settings reduce the lighting hours of the cold-cathode lamp at temperatures equal to or below the setting temperature. Accordingly, the operating life of the cold-cathode lamp can be sufficiently extended. As the cold-cathode lamp is lit during the time when the MFD is frequently used and when the room temperature of the office is low, the operating of the cold-cathode lamp is remarkably shortened. If the first predetermined temperature is set high, to prevent the above-described situation, the cold-cathode lamp will often not be lit when image reading is not performed. This causes an inconvenience to the user. Therefore, by setting the first predetermined time to, for example, 1 hour when the detected temperature is equal to or below the setting temperature, the cold-cathode lamp may be turned off, such as when the user does not use the MFD, to make a copy of the read medium for an hour or more, after the cold-cathode lamp is lit.

For the first predetermined time, three or more settings, rather than two settings, may be made.

The first predetermined time may be determined based on the temperature detected at the time when the cold-cathode lamp starts to light up, or the latest temperature among temperatures detected at a certain cycle while the cold-cathode lamp is lighting.

The image reading device of the invention may include a lighting-up control device that turns on the cold-cathode lamp when the cold-cathode lamp is not lit and when the temperature detected by the temperature detecting device is equal to or above a second predetermined temperature which is higher than the first predetermined temperature.

In the image reading device, the cold-cathode lamp may be turned on automatically. More specifically, the cold-cathode lamp is turned off as the room temperature decreases and the detected temperature is equal to or below the first predetermined temperature. However, the cold-cathode lamp, which is not lit, is automatically turned on, as the room temperature goes up when the morning comes or when the heater is turned on, and the detected temperature is equal to or above a second predetermined temperature. Accordingly, the user who makes a copy of the read medium first in the day, does not have to wait until the cold-cathode lamp reaches a brightness required for the image reading.

The second predetermined temperature may be determined based on the first predetermined temperature. The second predetermined temperature may be set prior to shipment, or set by the user, according to geographic areas or seasons. Further, a structure such that a certain range given to the first predetermined temperature is automatically set as the second predetermined temperature, may be employed.

Further, the image reading device of the invention may include an image reading prohibiting device that prohibits the image reading from being started, until a second predetermined time elapses after the cold-cathode lamp starts to light, and an image reading prohibiting time varying device that varies the second predetermined time, based on the temperature detected by the temperature detecting device.

In the image reading device, the time until the image reading is started after the cold-cathode lamp starts to light can be reduced to a minimum, according to the lamp wall temperatures, so that the time that the user has to wait can be greatly reduced.

The time required for the cold-cathode lamp to reach the proper brightness for the image reading, after the lamp is started to be lit up varies according to the lamp wall temperatures. Therefore, by varying the time until the image reading is started, after the cold-cathode lamp starts to light, according to the detected lamp wall temperature, the image reading can be started at the time when the cold-cathode lamp reaches the proper brightness for image reading. Consequently, when the user presses, for example, a copy key, with the cold-cathode lamp being turned off, the copying operation may be started with the minimum waiting time.

According to another aspect of the invention, there is provided a storage medium storing a program for controlling an image reading device including a cold-cathode lamp as a light source for image reading. The cold-cathode lamp is lit even when the image reading is not performed. The storage medium may store a lighting-out control program for turning off the cold-cathode lamp when the image reading is not performed and when a temperature detected by a temperature detecting device that detects a wall temperature of the cold-cathode lamp or a temperature that has correlation to the lamp wall temperature, is equal to or below a first predetermined temperature.

By activating a central processing unit (CPU) based on the program stored in the storage medium, the above-described operations of the image reading device can be achieved.

The storage medium may be a non-volatile semiconducting memory. Other than the non-volatile semiconducting memory, the storage medium may be a volatile semiconducting memory backed up by, for example, a battery, a compact disk read only memory (CD-ROM), a flexible disk, or a hard disk.

BRIEF DESCRIPTION OF THE DRAWINGS

A preferred embodiment of the invention will be described in detail with reference to the following figures wherein:

FIG. 6A is a table illustrating the relationship between continuous lighting hours of the cold-cathode lamp, and the wall temperature thereof;

FIG. 6B is a table illustrating the relationship between continuous lighting hours of the cold-cathode lamp, and the wall temperature thereof; and FIG. 7 is a flowchart illustrating a cold-cathode lamp controlling processing executed by a CPU of the multi-function device, which is shown in FIG. 1.

Further objects, details, and advantages of the invention will be apparent from the following detailed description, when read in conjunction with the drawings.

DETAILED DESCRIPTION OF PREFERRED EMBODIMENT

A preferred embodiment of the invention will be described in detail with reference to the figures.

The embodiment will be explained below, along with the following terms: a first predetermined time; a second predetermined time; a first predetermined temperature; and a second predetermined temperature. The first predetermined time is the maximum continuous lighting hours of a cold-cathode lamp 21. The second predetermined time is the time to allow an image sensor in an image reading unit 11 to start the image reading after application of a drive voltage to the cold-cathode lamp 21 is started. That is, the second predetermined time defines the time during which the image reading is prohibited. The first predetermined time, and the second predetermined time can be changed according to the lamp wall temperatures (ambient temperatures).

The first predetermined temperature is the temperature set slightly lower than the ambient temperature during the time when a user frequently uses an image reading device of the invention. The cold-cathode lamp 21 is automatically turned off when the ambient temperature (lamp wall temperature) becomes equal to or lower than the first predetermined temperature. The second predetermined temperature is set higher than the first predetermined temperature. The cold-cathode lamp 21 is automatically turned on at the second predetermined temperature or higher.

Figure 1:
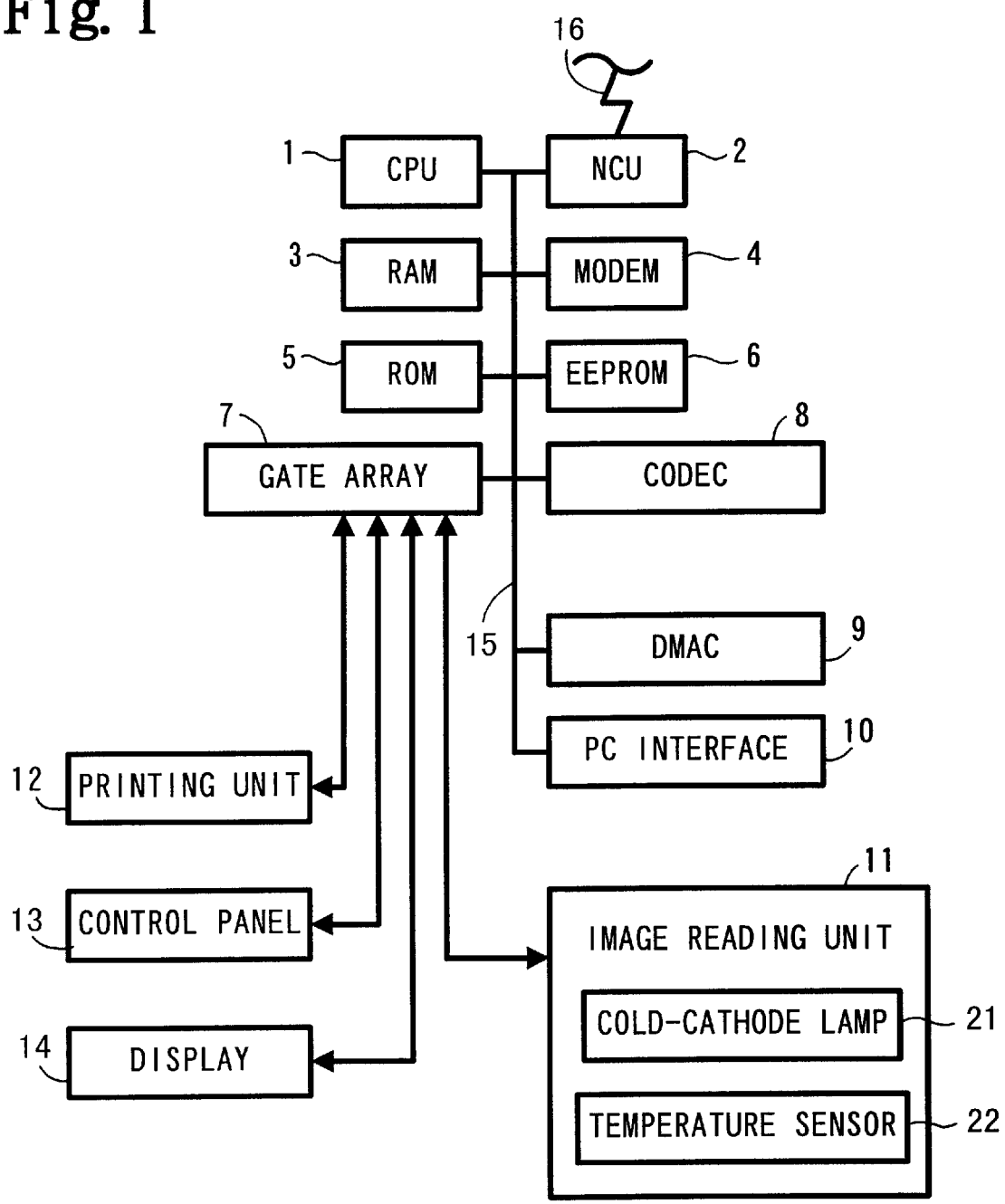
FIG. 1 is a block diagram of a multi-function device, including an image reading device, according to an embodiment of the invention.

FIG. 1 is a block diagram of a multi-function device (hereinafter referred to as the MFD), including an image reading device, according to an embodiment of the invention. The MFD includes the following components: a central processing unit (CPU) 1; a network control unit (NCU) 2; a random-access memory (RAM) 3; a modem 4; a read-only memory (ROM) 5; an electrically erasable programmable read-only memory (EEPROM) 6; a gate array 7; a CODEC 8; a direct memory access controller (DMAC) 9; a PC interface circuit 10; the image reading unit 11; a printing unit 12; a control panel 13; and a display 14. The CPU 1, the NCU 2, the RAM 3, the modem 4, the ROM 5, the EEPROM 6, the gate array 7, the CODEC 8, the DMAC 9, and the PC interface circuit 10, are connected with each other by a bus line 15. The bus line 15 includes an address bus, a data bus, and a control signal line. The image reading unit 11, the printing unit 12, the control panel 13, and the display 14, are connected to the gate array 7. The NCU 2 is connected to, for example, a telephone line 16 of a communication line, and the modem 4. A personal computer (not shown) is connected to the PC interface circuit 10. The image reading unit 11 includes the cold-cathode lamp 21 used as a light source for the image reading, and a temperature sensor 22 that detects the wall temperature of the lamp 21.

The MFD has various functions, for example, facsimile communication functions, copying functions, image scanner functions, and printer functions. The facsimile communication functions may be employed when the MFD is used stand-alone, or the MFD is used with the personal computer connected via the PC interface circuit 10.

The CPU 1 controls the operations of the MFD.

The NCU 2, which is connected to the telephone line 16, performs the network controls.

The RAM 3 stores various data, such as command data from the personal computer, and various flags. The RAM 3 also provides space for the operations by the CPU 1. As will be described below, flags stored in the RAM 3 are a lighting flag that indicates the cold-cathode lamp 21 turning on and turning off, and an image reading permit flag that allows the image reading unit 11 to read the images on the read medium, such as an original document, to name a few. The RAM 3 also may store the settings of the first and second predetermined temperatures, as well as the first and the second predetermined times, made by the user, using the control panel 13.

The modem 4 modulates transmission data and demodulates reception data.

The ROM 5 stores various kinds of programs and data, such as initial setting values.

Figure 5:
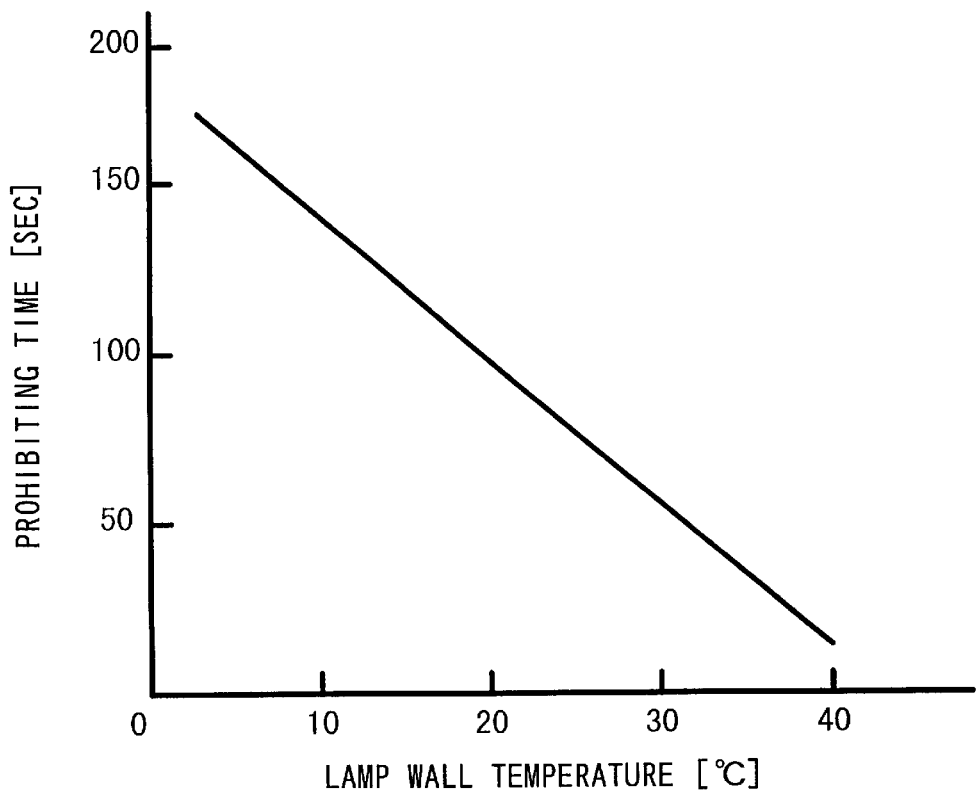
FIG. 5 is a chart illustrating the correlation between a prohibiting time of an image reading, and the wall temperature of the cold-cathode lamp.

The EEPROM 6 stores various kinds of tables that include data sets to control the image reading unit 11, various kinds of flags, such as an initial setting flag, telephone numbers used for the single button dialing or abbreviated dialing, and communication records. As will be described below, tables stored in the EEPROM 6, are a table specifying the first predetermined time, according to the lamp wall temperature detected by the temperature sensor 22, such as shown in FIGS. 6A and 6B, and a table specifying the correlation between the second predetermined time and the lamp wall temperature detected by the temperature sensor 22, based on the correlation chart, such as shown in FIG. 5, to name a few.

The gate array 7 controls the communication between the CPU 1 and the image reading unit 11, the printing unit 12, the control panel 13, and the display 14.

The CODEC 8 encodes the transmission data and decodes the reception data.

The DMAC 9 controls the data writing into, and data reading from, the RAM 3.

The PC interface circuit 10 controls the communication between the CPU 1 and the personal computer.

In addition to the cold-cathode lamp 21 and the temperature sensor 22, the image reading unit 11 includes a glass plate to place an original document thereon, an image sensor, and a motor to reciprocatingly move the cold-cathode lamp 21 and the image sensor. The image reading unit 11 reads an original document and outputs an analog image signal. The image reading unit 11 is a flat bed type.

The printing unit 12 includes a printing device of, for example, an electro-photography type that uses a laser beam, or an inkjet type. The printing unit 12 records images, based on printing data, onto a print sheet.

The control panel 13 has various keys that are operated by the user, for example, to switch modes, to designate operations, and to make various settings and registration. The control panel 13 outputs a signal according to the user's operation.

The display 14 includes a liquid crystal display (LCD), to display various information under the control of the CPU 1.

Figure 4:
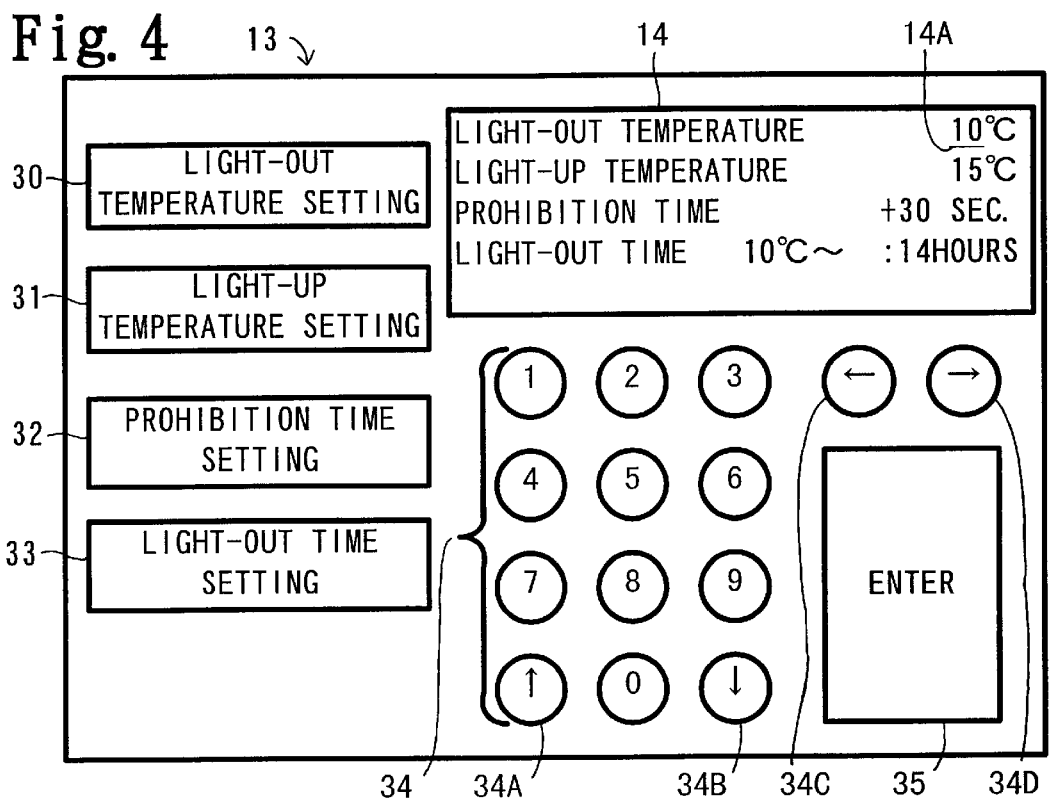
FIG. 4 is a detailed schematic of a part of a control panel and a display of the multi-function device.

Referring to FIG. 4, a part of the control panel 13 and the display 14 will be explained. As shown in FIG. 4, provided on a part of the control panel 13, are a light-out temperature setting key 30, to set the first predetermined temperature; a light-up temperature setting key 31, to set the second predetermined temperature; a prohibiting time setting key 32, to set the second predetermined time; a light-out time setting key 33, to set the first predetermined time; ten-numbered keys 34, and an enter key 35. As shown in FIG. 4, the display 14 (LCD) is provided adjacent to the control panel 13. For example, when the user presses a key (not shown) to enter a temperature or time setting mode of the MFD, the display 14, such as shown in FIG. 4, will appear. Thereafter, as the user presses, for example, the light-out temperature setting key 30, to set the first predetermined temperature, that is, to set the temperature at which the cold-cathode lamp 21 is turned off, a cursor 14A appears in the display 14. The user can input the light-out temperature, using the ten-numbered keys 34, in consideration of geographic areas, ambient conditions, and seasons where the MFD is placed. In FIG. 4, the light-out, or turning off, temperature is currently set to 10° C. When the light-out temperature is set to, for example, 20° C., the user presses the "2" and "0" keys in the ten-numbered keys 34, each one time, so that "20" will be indicated on the display 14. When the light-out temperature is set to the temperature slightly higher or lower than the temperature currently set, the user may use an up arrow key 34A or a down arrow key 34B. The current setting of 10° C. is indicated for the light-out temperature. When the user presses the up arrow key 34A once, the light-out temperature indication is changed to 11° C. When the user presses the down arrow key 34B once, the light-out temperature indication is changed to 9° C. Temperature setting may be made in increments of 0.1° C. or 0.5° C., rather than 1° C.

Thereafter, when the user presses the enter key 35, the light-out temperature is determined. The light-out temperature setting is stored in the EEPROM 6. The cursor 14A disappears from the display 14.

The user can set the light-up, turn-on, temperature (the second predetermined temperature), the prohibiting time (the second predetermined time), and the light-out, turn-off, time (the first predetermined time), in the same manner as described above when the light-out temperature is set. More specifically, the user presses the relevant setting keys 31–33, to set the light-up temperature, the prohibiting time, or the light-out time. Thereafter, the cursor 14A will appear in the relevant temperature or time field on the display 14. With the cursor 14A indicated, the user inputs the temperature or time, using the ten-numbered keys 34, the up arrow key 34A, or the down arrow key 34B. When the user presses the enter key 35, after inputting the temperature or time, the setting is stored in the EEPROM 6.

In FIG. 4, the prohibiting time, which corresponds to the second predetermined time, is indicated as "+30 sec." The setting of the image reading prohibiting time (second predetermined time), which is determined by the table based on the correlation chart shown in FIG. 5, can be changed by the user, in consideration of changes in time required for the cold-cathode lamp 21 to reach the proper brightness for the image reading, due to the deterioration of the cold-cathode lamp 21, with time.

Also, in FIG. 4, the light-out time is indicated as "10° C.-: 14 hours". This indication means that the cold cathode lamp 21 is turned off after the 14 hours of lighting, when the lamp wall temperature (ambient temperature) is 10° C. or higher. Therefore, when the light-out time is indicated as "5° C.-10° C.: 1 hour", this indication means the cold cathode lamp 21 is turned off after the 1 hour of lighting, when the lamp wall temperature (ambient temperature) is from 5° C. up to but not including 10° C. Further, when the light-out time is indicated as "-5° C.: 0.5 hours", this indication means the cold cathode lamp 21 is turned off after 0.5 hours of lighting when the lamp wall temperature (ambient temperature) is up to but not including, i.e., less than, 5° C.

When the light-out time setting is changed from, for example, "10° C.-: 14 hours", which is currently indicated on the display 14, the user presses the light-out time setting key 33. Thereafter, with the cursor 14A positioned below "10" of "10° C.-: 14 hours" in FIG. 4, a desirable temperature can be input using the ten-numbered keys 34, the up arrow key 34A, or the down arrow key 34B. Then, the user presses a right arrow key 34D, to move the cursor 14A to the right where the blank area after the dash (-), is indicated in FIG. 4. If the user would like to set an upper limit temperature, the user can input the upper limit temperature, using the ten-numbered keys 34, the up arrow key 34A, or the down arrow key 34B. If the same light-out time is set for the temperatures equal to and above 10° C., the user inputs, for example, "00", using the ten-numbered keys 34. (After inputting "00", "00" is not indicated and the area remains blank.) Then, the user presses the right arrow key 34D, to move the cursor 14A further to the right where "14" is indicated. With the cursor 14A positioned below "14", the user can input a desirable time. After inputting the desirable time, the user presses the enter key 35, so that one of settings for the light-out time is thus finished. To make another light-out time setting, the user presses the light-out time setting key 33 again, and repeats the above-described procedures.

In the above-described embodiment, three settings are made for the light-out time. However, for example, two or multiple settings, other than three settings, may be made for the light-out time, as will be described below.

The part of the control panel 13 and the display 14 shown in FIG. 4, is given as an example. Therefore, the control panel 13 and the display 14 are not limited to those shown in FIG. 4, but the control panel 13 and the display 14 may be differently configured, so long as the user can variably set the respective temperatures and times.

The cold-cathode lamp 21 radiates a white light, to irradiate an original document.

The temperature sensor 22, that detects the wall temperature of the cold-cathode lamp 21 is provided near the lamp 21, without contacting thereto. The temperature sensor 22 may be a contact type sensor that detects the wall temperature of the lamp 21 while contacting thereto.

The controls to turn on and to turn off the cold-cathode lamp 21 in the MFD will be briefly explained below.

Generally, an ambient temperature of, for example, an office is low late at night through early in the morning. However, at the time when and after workers come to the office, the ambient temperature of the office gradually increases. When a temperature detected by the temperature sensor 22 of the MFD becomes equal to or exceeds the second predetermined temperature, the CPU 1 outputs a command to turn on the cold-cathode lamp 21. Accordingly, the cold-cathode lamp 21 in the image reading unit 11 is turned on. As described above, the second predetermined temperature is the temperature at which the cold-cathode lamp 21 is turned on by the CPU 1 starting a voltage application to the cold-cathode lamp 21, which is not lit. Also, as described above, the second predetermined temperature setting can be changed by the user according to geographic area or season.

Figure 2:
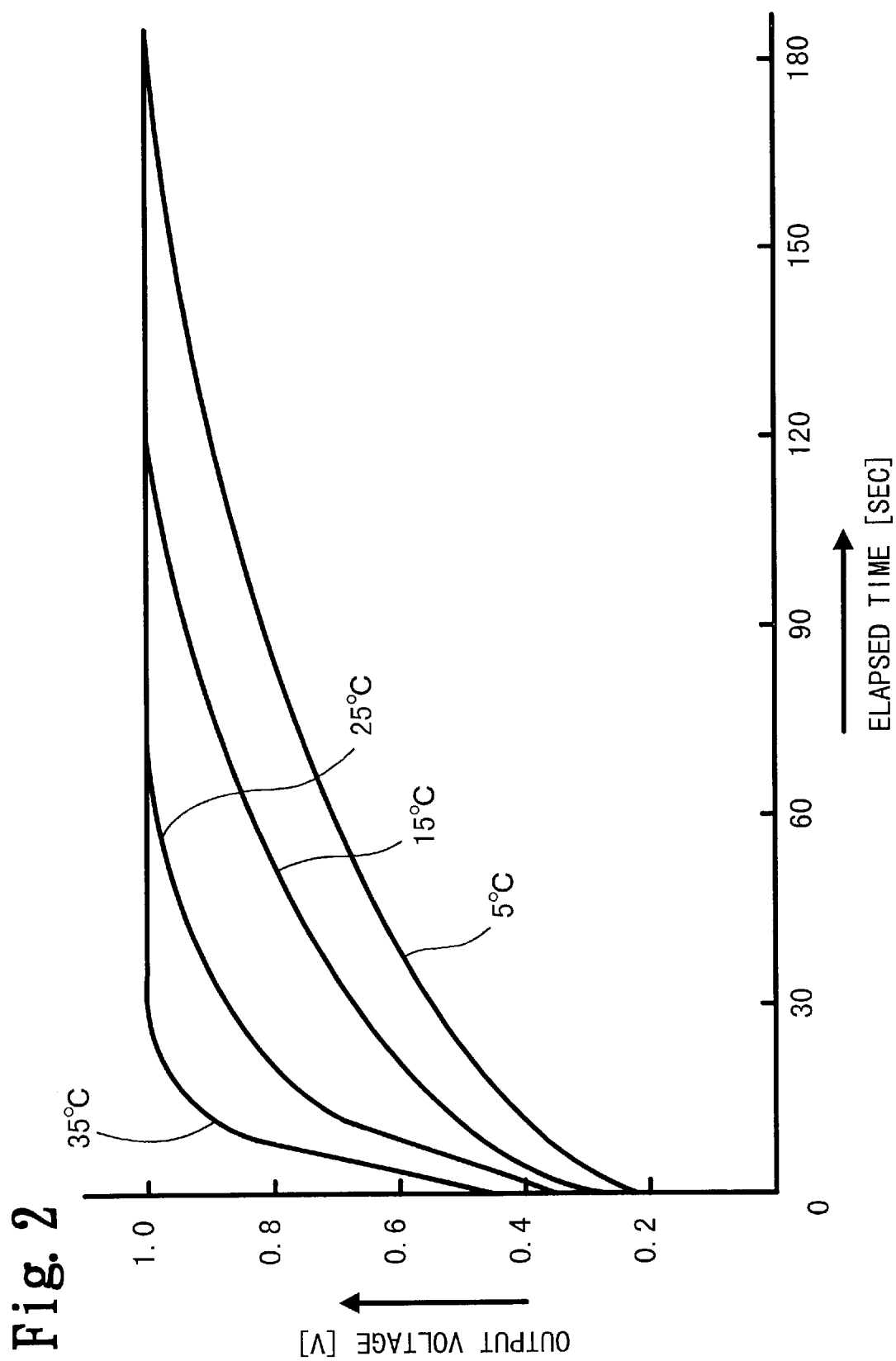
FIG. 2 is an explanatory schematic illustrating the relationship between the time elapsed after a drive voltage is applied to a cold-cathode lamp, brightness of the lamp, and lamp wall temperatures.

As described above, a certain length of time is required for the cold-cathode lamp 21 to reach a proper brightness for image reading after the voltage application to the lamp 21 is started. For the proper image reading, the image reading operation by the image reading unit 11 needs to be prohibited until some length of time has elapsed after the voltage application to the lamp 21 is started. Generally, the time required for the cold-cathode lamp 21 to reach the proper brightness for the image reading, after the voltage application to the lamp 21 is started, varies according to lamp wall temperatures, as shown in FIG. 2, although it differs according to the type of the cold-cathode lamp 21. In FIG. 2, the horizontal axis indicates the time elapsed after the voltage application to the cold-cathode lamp 21 is started. The vertical axis indicates an output voltage of the image sensor in the image reading unit 11, when the lamp wall temperatures are 5° C., 15° C., 25° C., and 35° C. The output voltage of the image sensor in the image reading unit 11, corresponds to the brightness of the cold-cathode lamp 21. According to the temperatures detected by the temperature sensor 22, the CPU 1 determines the second predetermined time to allow the image reading unit 11 to start the image reading operation after the voltage application to the lamp 21 is started. More specifically, the higher the temperature detected by the temperature sensor 22, the shorter the time to allow the image reading unit 11 to start the image reading operation after the voltage application to the lamp 21 is started (that is, the shorter the second predetermined time corresponding to the image reading prohibiting time) becomes. With this structure, the image reading operation can be immediately started as soon as the cold-cathode lamp 21 reaches a brightness suitable for the image reading. Even when the cold-cathode lamp 21 is not lit at the time the user presses a copy key on the control panel 13, to make a copy of an original document, the user's waiting time until the image reading is started, can be reduced as much as possible according to the temperature detected by the temperature sensor 22. At this time, a table of information based on the correlation chart, such as shown in FIG. 5, which is stored in the EEPROM 6, is used. More specifically, the EEPROM 6 stores the table specifying the correlation between the lamp wall temperature and the time to allow the image reading unit 11 to start the image reading operation after the voltage application to the lamp 21 is started (that is, correlation between the lamp wall temperature and the second predetermined time corresponding to the image reading prohibiting time). Using the table stored in the EEPROM 6, the CPU 1 can determine the second predetermined time, according to the temperature detected by the temperature sensor 22. However, the correlation between the image reading prohibiting time and the lamp wall temperature, such as shown in FIG. 5, may slightly be changed, due to the deterioration of the cold-cathode lamp 21, with time. Therefore, the user can make fine adjustments of the second predetermined time, as explained above with reference to FIG. 4.

During normal office hours, the room temperature is properly adjusted, as necessary, for example, with an air conditioning. Therefore, during the normal office hours, the temperature detected by the temperature sensor 22 will exceed the first predetermined temperature, even in winter, because the first predetermined temperature, which corresponds to the cold-cathode lamp 21 lighting-out temperature, is set slightly lower than the ambient temperature during the normal office hours. Accordingly, the cold-cathode lamp 21 is continuously turned on during normal office hours. When the user presses, for example, a copy key provided on the control panel 13, the image reading operation by the image sensor in the image reading unit 11 is immediately started.

Figure 3:
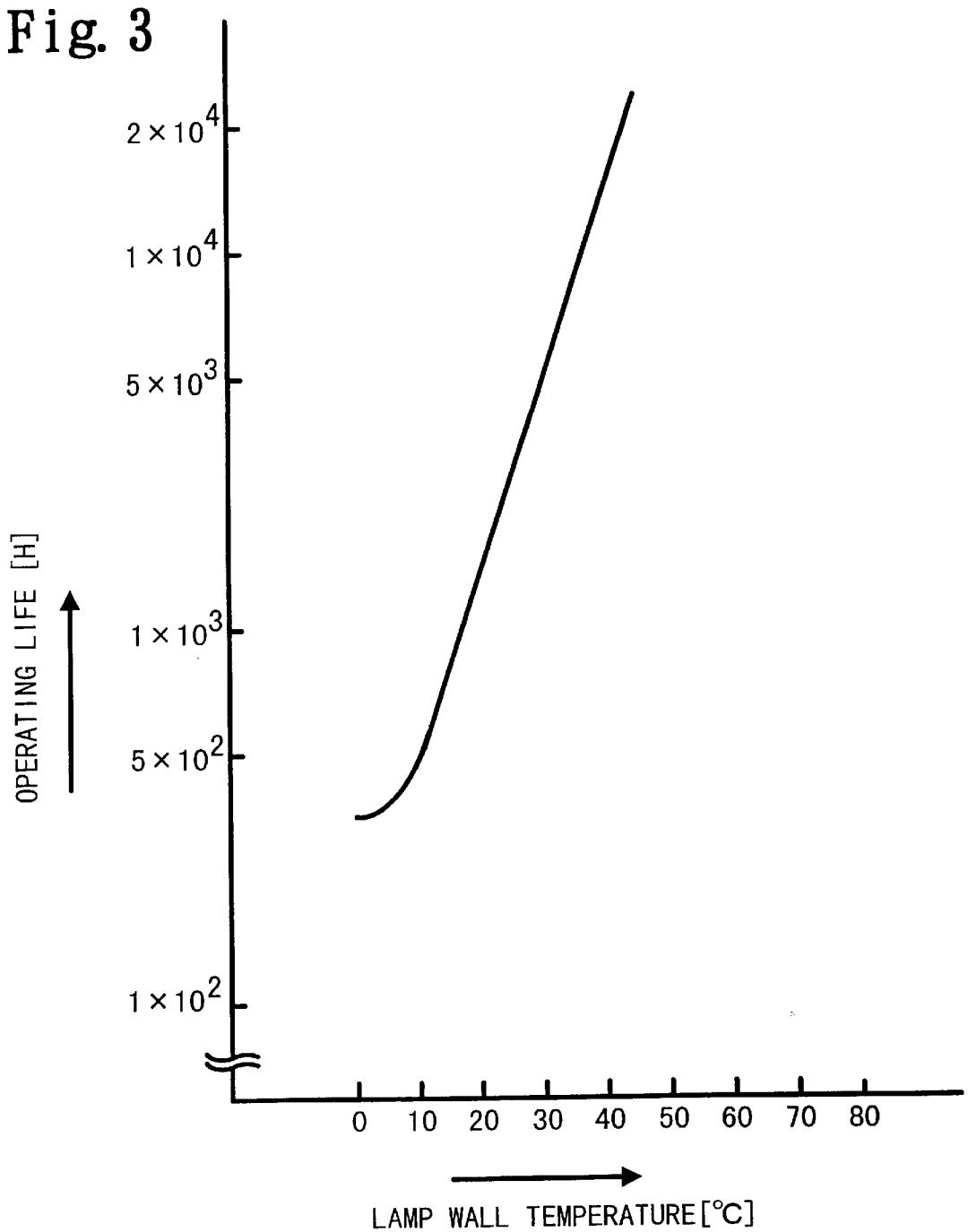
FIG. 3 is an explanatory schematic illustrating the relationship between the wall temperatures of the cold-cathode lamp during lighting, and the operating life of the lamp.

After the normal office hours end, the room temperature gradually decreases so that the temperature detected by the temperature sensor 22 becomes equal to or below the first predetermined temperature. When the temperature detected by the temperature sensor 22 becomes equal to or below the first predetermined temperature, the CPU 1 outputs a command to turn off the cold-cathode lamp 21. Accordingly, the cold-cathode lamp 21 in the image reading unit 11, is turned off. The operating life of the cold-cathode lamp 21 is determined by the cumulative turned on or lit hours and the lamp wall temperatures during the turned on hours, as described above. It is known that the operating life of the lamp decreases exponentially with the decrease in the lamp wall temperature while turned on, as shown in FIG. 3. In FIG. 3, the horizontal axis indicates the wall temperature of the cold-cathode lamp 21. The vertical axis indicates an operating life of the lamp 21. To increase the operating life of the cold-cathode lamp 21, it is necessary to turn the cold-cathode lamp 21 off when the lamp wall temperature is low. The first predetermined temperature is set lower than the second predetermined temperature. The first predetermined temperature setting can be changed by the user, according to geographic area or season, as explained above with reference to FIG. 4.

Even after the normal office hours are past, the room temperature might not decrease very much, staying high, for example, on a sultry night in summer. When the first predetermined time has elapsed after the lighting of the cold-cathode lamp 21 is started, it is preferable that the CPU 1 outputs a command to turn the lamp 21 off, even when the temperature detected by the temperature sensor 22, exceeds the first predetermined temperature. With such configurations, the cold-cathode lamp 21 in the image reading unit 11 can be turned off after regular office hours regardless of the room temperature of the office.

The first predetermined time is determined by the CPU 1, according to the temperatures detected by the temperature sensor 22. For example, when the temperature detected by the temperature sensor 22 is 10° C. or more, the first predetermined time is set to 14 hours. When the temperature detected by the temperature sensor 22 is below 10° C., the first predetermined time is set to an hour. Such a structure enables the turned on hours of the cold-cathode lamp 21 to be reduced to a minimum when the lamp wall temperature is low. The relationship between the temperature detected by the temperature sensor 22, and the first predetermined time can be changed according to the office environment.

Three or more settings can be made for the first predetermined time, according to the temperatures detected by the temperature sensor 22. For example, when the temperature detected by the temperature sensor 22 is equal to or exceeds 10° C., the first predetermined time may be set to 14 hours. When the temperature detected by the temperature sensor 22 falls between the range of 5° C. up to but not including 10° C., the first predetermined time may be set to 1 hour. When the temperature detected by the temperature sensor 22 is less than 5° C., the first predetermined time may be set to 30 minutes. As a reference temperature, which determines the first predetermined time, the following temperature detected by the temperature sensor 22 may be used: Temperature detected when the cold-cathode lamp 21 is started to turn on; or the latest temperature among temperatures detected at a certain cycle while the lamp 21 is lit.

The temperature sensor 22 includes a temperature detecting device that detects a wall temperature of a cold-cathode lamp or a temperature that has correlation to the lamp wall temperature.

The CPU 1 realizes a lighting-out control device that turns off a cold-cathode lamp when the image reading is not performed and when a temperature detected by the temperature detecting device is equal to or below the first predetermined temperature.

The CPU 1 realizes a lighting-up control device that turns on a cold-cathode lamp when the cold-cathode lamp is not lit and when a temperature detected by the temperature detecting device is equal to or exceeds the second predetermined temperature, which is higher than the first predetermined temperature.

The CPU 1 realizes an image reading prohibiting device that prohibits an image reading until the second predetermined time has elapsed after the lighting of the cold-cathode lamp was started.

The CPU 1 realizes an image reading prohibiting time adjusting device that adjusts the second predetermined time, based on a temperature detected by the temperature detecting device.

The ROM 5 is a storage medium that stores programs for controlling an image reading device having a cold-cathode lamp as a light source for the image reading, the image reading device lighting the cold-cathode lamp even when the image reading is not performed. The ROM 5 is a storage medium that stores programs including a lighting-out control program for turning off the cold-cathode lamp when the image reading is not performed and when a wall temperature of the cold-cathode lamp or a temperature that has a correlation to the lamp wall temperature, detected by the temperature detecting device, is equal to or below the first predetermined temperature.

Operations executed by the CPU 1 to achieve the above-described controls for the cold-cathode lamp 21 will be explained with reference to FIG. 7. FIG. 7 is a flowchart illustrating cold-cathode lamp controlling processing executed by the CPU 1. This processing is a main routine. The processing may not always be performed at a fixed time interval, but at a very short time intervals.

First, the CPU 1 reads a temperature detected by the temperature sensor 22 (S1). More specifically, the CPU 1 reads data about the detected temperature, output from the temperature sensor 22 and converted into digital data by the gate array 7. The CPU 1 stores the data about the detected temperature in the RAM 3. Then, the CPU 1 determines whether the cold-cathode lamp 21 is lit (S2). This determination may be made by the use of, for example, a lighting flag. The lighting flag is set in the RAM 3, at the same time when the CPU 1 applies the voltage to the cold-cathode lamp 21, to light up the lamp 21, in step S4 (described below). When the CPU 1 stops applying the voltage to the cold-cathode lamp 21, to turn off the lamp 21, the lighting flag in the RAM 3 is reset. Thus, the determination as to whether the cold-cathode lamp 21 is lit can be made by determining whether the lighting flag is set.

When the cold-cathode lamp 21 is not lit (S2: NO), that is, the lighting flag is not set, the CPU 1 determines whether the temperature, detected by the temperature sensor 22, is equal to or exceeds the second predetermined temperature (S3). More specifically, the CPU 1 reads out the data about the detected temperature which is stored in the RAM 3 in step S1. Then, the CPU 1 determines whether the detected temperature is equal to or exceeds the second predetermined temperature stored in the EEPROM 6.

When the detected temperature is equal to or exceeds the second predetermined temperature (S3: YES), the CPU 1 turns the cold-cathode lamp 21 on (S4). More specifically, the CPU 1 controls a power supply control circuit (not shown) to apply the drive voltage to the cold-cathode lamp 21. At this time, the lighting flag is set in the RAM 3 as described above. Thereafter, the CPU 1 determines the first and second predetermined time (S5). More specifically, the CPU 1 reads out the data about the detected temperature, which is stored in the RAM 3 in step S1. Then, the CPU 1 reads from a table in the EEPROM 6, the first and second predetermined times that correspond to the detected temperature.

As described above, the first predetermined time is the maximum continuous lighting hours of the cold-cathode lamp 21. When the first predetermined time has elapsed after the turning on of the cold-cathode lamp 21 was started, the cold-cathode lamp 21 is turned off, regardless of the temperature detected by the temperature sensor 22. The second predetermined time is the time to allow the image reading unit 11 to start the image reading operation after the voltage application to the lamp 21 is started. Until the second predetermined time elapses after the drive voltage application to the cold-cathode lamp 21 is started, the image reading by the image sensor in the image reading unit 11 is prohibited, even when the user designates the image reading to operation.

The CPU 1 then starts first and second timers (S6). More specifically, the CPU 1 sets the first timer for the first predetermined time determined in step S5. The CPU 1 sets the second timer for the second predetermined time determined in step S5. The CPU 1 causes the first and the second timers to clock the time. The first and the second timers may be realized by, for example, a counter that counts the number of pulses in a predetermined cycle as clock signals. The first and the second timers may also be realized by the use of a clock circuit.

The CPU 1 determines whether the time in the second timer, is up (S7).

When the time in the second timer, is up (S7: YES), the cold-cathode lamp 21 has reached the proper brightness for the image reading. Therefore, the CPU 1 sets the image reading permit flag (S8), whereupon the routine ends. The image reading permit flag is stored in the RAM 3.

In step S7, when the time in the second timer is not up (S7: NO), the cold-cathode lamp 21 has not yet reached a predetermined brightness so that the CPU 1 waits until the time in the second timer is up.

In step S3, when the detected temperature is not equal to or does not exceed the second predetermined temperature (S3: NO), the CPU 1 determines whether the key operation is performed by the user (S9). More specifically, the CPU 1 determines whether the user presses, for example, a copy key provided on the control panel 13 or other keys which are required for the image reading by the image reading unit 11.

When the key operation is performed (S9: YES), the flow goes to step S4, because the cold-cathode lamp 21 needs to be turned on for the image reading.

In step S9, when the key operation is not performed (S9: NO), the routine ends, because the cold-cathode lamp 21 does not have to be lit.

In step S2, when the cold-cathode lamp 21 is lit (S2: YES), the CPU 1 determines whether the temperature detected by the temperature sensor 22 is equal to or below the first predetermined temperature. More specifically, the CPU 1 reads out the data about the detected temperature which is stored in the RAM 3 in step S1. Then, the CPU 1 determines whether the detected temperature is equal to or below the first predetermined temperature stored in the EEPROM 6.

When the temperature detected by the temperature sensor 22, is equal to or below the first predetermined temperature (S10: YES), the CPU 1 resets the first timer (S11). When the temperature detected by the temperature sensor 22 is equal to or below the first predetermined temperature, the clocking by the first timer becomes unnecessary. Therefore, the first timer is reset.

The CPU 1 then determines whether image reading is being performed. More specifically, the CPU 1 determines whether the image sensor in the image reading unit 11 is reading an original document.

When the image reading is not being performed (S12: NO), the CPU 1 turns off the cold-cathode lamp 21 (S13). More specifically, the CPU 1 controls the power supply control circuit (not shown) to stop the drive voltage application to the cold-cathode lamp 21.

The CPU 1 then resets the lighting flag and the image reading permit flag stored in the RAM 3 (S14), whereupon the routine ends.

In step S12, when the image reading is being performed (S12: YES), the cold-cathode lamp 21 cannot be turned off. The CPU 1 repeats the determination in S12, until the image reading is finished.

In step 10, when the temperature detected by the temperature sensor 22 exceeds the first predetermined temperature (S10: NO), the CPU 1 determines whether the time in the first timer is up (S15).

When the time in the first timer is up (S15: YES), the flow goes through step S12, to turn off the cold-cathode lamp 21.

In step S15, when the time in the first timer is not up (S15: NO), the routine ends.

In the above-described embodiment, the cold-cathode lamp 21 is structured to be turned off as the first predetermined time elapses after the lighting of the cold-cathode lamp 21 is started, regardless of the temperature detected by the temperature sensor 22. However, the cold-cathode lamp 21 may be controlled only by the temperature detected by the temperature sensor 22 so as to be turned on or off. In this case, the cold-cathode lamp 21 is continuously lit until the temperature detected by the temperature sensor 22 becomes equal to or below the first predetermined temperature.

Also, in the above-described embodiment, the first predetermined time is changeable according to the temperature detected by the temperature sensor 22. However, the first predetermined time may be determined regardless of the temperature detected by the temperature sensor 22. In this case, the first predetermined time is fixed or is changed by the user's setting.

Further, in the above-described embodiment, the cold-cathode lamp 21 is structured so as to be automatically lit up when the temperature detected by the temperature sensor 22 becomes equal to or exceeds the second predetermined temperature. However, the cold-cathode lamp 21 may be structured so as to be turned on based on the user's key operation. In this case, the cold-cathode lamp 21 is turned on when the temperature detected by the temperature sensor 22 is equal to or exceeds the second predetermined temperature and when the user presses, for example, the copy key provided on the control panel 13 or other keys which require image reading.

Further, in the above-described embodiment, the second predetermined time is changeable according to the temperature detected by the temperature sensor 22. However, the second predetermined time may be determined regardless of the temperature detected by the temperature sensor 22. In this case, the second predetermined time is fixed or is changed by the user's setting.

Further, in the above-described embodiment, the temperature sensor 22 is disposed adjacent to the cold-cathode lamp 21 so that the wall temperature of the lamp 21 can be detected. However, the sensor 22 may be disposed at a position some distance away from the cold-cathode lamp 21 inside the body case of the MFD or on the outer surface of the body case of the MFD.

Further, in the above-described embodiment, the image reading device of the invention is employed for the MFD. However, the image reading device of the invention may be employed for an ordinary facsimile apparatus, an image scanner, and digital and analog copying machines.

While the invention has been described with reference to the embodiments, it is to be understood that the invention is not restricted to the particular forms shown in the foregoing embodiments. Various modifications and alterations can be made thereto without departing from the scope of the invention.

What is claimed is:

1. An image reading device including a cold-cathode lamp as a light source for image reading, the cold-cathode lamp being lit even when the image reading is not performed, comprising:

a temperature detecting device that detects a wall temperature of the cold-cathode lamp or a temperature that has correlation to the lamp wall temperature; and a lighting-out control device that turns off the cold-cathode lamp when the image reading is not performed and when a temperature detected by the temperature detecting device is equal to or below a first predetermined temperature.

2. The image reading device according to claim 1, wherein when the cold-cathode lamp has been lit for a first predetermined time or more, the lighting-out control device turns off the cold-cathode lamp, even when the temperature detected by the temperature detecting device is not equal to or below the first predetermined temperature if the image reading is not performed.

3. The image reading device according to claim 2, wherein the lighting-out control device varies the first predetermined time based on the temperature detected by the temperature detecting device.

4. The image reading device according to claim 1, further comprising a lighting-up control device that turns on the cold-cathode lamp when the cold-cathode lamp is not lit and when the temperature detected by the temperature detecting device is equal to or above a second predetermined temperature which is higher than the first predetermined temperature.

5. The image reading device according to claim 1, further comprising an image reading prohibiting device that prohibits the image reading from being started until a second predetermined time elapses after the cold-cathode lamp starts to turn on.

6. The image reading device according to claim 5, further comprising an image reading prohibiting time varying device that varies the second predetermined time based on the temperature detected by the temperature detecting device.

7. A storage medium storing a program for controlling an image reading device including a cold-cathode lamp as a light source for image reading, the cold-cathode lamp being lit even when the image reading is not performed, comprising a lighting-out control program for turning off the cold-cathode lamp when the image reading is not performed and when a temperature detected by a temperature detecting device that detects a wall temperature of the cold-cathode lamp or a temperature that has correlation to the lamp wall temperature is equal to or below a first predetermined temperature.

8. The storage medium according to claim 7, wherein when the cold-cathode lamp has been lit for a first predetermined time or more, the lighting-out control program turns off the cold-cathode lamp even when a temperature detected by the temperature detecting device is not equal to or below the first predetermined temperature if the image reading is not performed.

9. The storage medium according to claim 8, the lighting-out control program varies the first predetermined time based on the temperature detected by the temperature detecting device.

10. The storage medium according to claim 7, further comprising a lighting-up control program for turning on the cold-cathode lamp when the cold-cathode lamp is not lit and when the temperature detected by the temperature detecting device is equal to or above a second predetermined temperature which is higher than the first predetermined temperature.

11. The storage medium according to claim 7, further comprising an image reading prohibiting program for prohibiting the image reading from being started until a second predetermined time elapses after the cold-cathode lamp starts to turn on.

12. The storage medium according to claim 11, further comprising an image reading prohibiting time varying program for varying the second predetermined time based on the temperature detected by the temperature detecting device.

13. A method for controlling an image reading device including a cold-cathode lamp as a light source for image reading, the cold-cathode lamp being lit even when the image reading is not performed, the method comprising the steps of:

detecting a wall temperature of the cold-cathode lamp or a temperature that has correlation to the lamp wall temperature; and turning off the cold-cathode lamp when the image reading is not performed and when a detected temperature is equal to or below a first predetermined temperature.

14. The method according to claim 13, wherein when the cold-cathode lamp has been lit for a first predetermined time or more, the turning off step turns off the cold-cathode lamp even when the detected temperature is not equal to or below the first predetermined temperature if the image reading is not performed.

15. The method according to claim 14, wherein the turning off step varies the first predetermined time, based on the detected temperature.

16. The method according to claim 13, further comprising the step of turning on the cold-cathode lamp when the cold-cathode lamp is not lit and when the detected temperature is equal to or above a second predetermined temperature which is higher than the first predetermined temperature.

17. The method according to claim 13, further comprising the step of prohibiting the image reading from being started until a second predetermined time elapses after the cold-cathode lamp starts to light.

18. The method according to claim 17, further comprising the step of varying an image reading prohibiting time that corresponds to the second predetermined time, based on the detected temperature.

* * * * *

UNITED STATES PATENT AND TRADEMARK OFFICE
CERTIFICATE OF CORRECTION

PATENT NO. : 6,741,372 B1
DATED : May 25, 2004
INVENTOR(S) : Murakami

It is certified that error appears in the above-identified patent and that said Letters Patent is hereby corrected as shown below:

Title page,
Item [*] Notice, should read -- Subject to any disclaimer, the term of this patent is extended or adjust under 35 U.S.C. 154(b) by 604 days. --

Signed and Sealed this

Twenty-second Day of March, 2005

JON W. DUDAS
*Director of the United States Patent and Trademark Office*